(12) United States Patent
Chang et al.

(10) Patent No.: US 6,169,907 B1
(45) Date of Patent: *Jan. 2, 2001

(54) POWER CONTROL OF REMOTE COMMUNICATION DEVICES

(75) Inventors: Yu-Wen Chang, Cupertino; Pi-Hui Chao, Milbrae, both of CA (US)

(73) Assignee: interWAVE Communications International Ltd., Hamilton (BM)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/954,865

(22) Filed: Oct. 21, 1997

(51) Int. Cl.[7] .................................................. H04B 7/00
(52) U.S. Cl. ............................................. 455/522; 455/127
(58) Field of Search ................................ 455/69, 67.1, 70, 455/126, 127, 343, 522

(56) References Cited

U.S. PATENT DOCUMENTS 5,345,598 * 9/1994 Dent ........................................ 455/69
5,689,815 * 11/1997 Yamazaki et al. ...................... 455/69
5,852,782 * 12/1998 Komatsu ............................... 455/522

* cited by examiner

Primary Examiner—Reinhard J. Eisenzopf
Assistant Examiner—Sam Bhattacharya
(74) Attorney, Agent, or Firm—Flehr Hohbach Test Albritton & Herbert LLP

(57) ABSTRACT

A first communication device is in communication with a second communication device. The communication may be characterized by a first and a second characteristic that are affected by a transmit power of the first communication device, each characteristic having an upper and a lower bound. The transmit power of the first communication device is delayed from being adjusted to bring the communication within the upper and lower bounds of the first criteria and outside the upper and lower bounds of the second criteria when a contrary adjustment of the transmit power of the first communication device was performed until a predetermined amount of time has expired since the contrary adjustment. Thus, unnecessarily repetitive power adjustments are avoided.

26 Claims, 8 Drawing Sheets

Signal Power

Quality Factor (Bit Error Rate)

Signal Power

Quality Factor (Bit Error Rate)

POWER CONTROL OF REMOTE COMMUNICATION DEVICES

BACKGROUND OF THE INVENTION

The present invention relates to apparatus and methods for improving cellular communication networks. More particularly, the present invention relates to improved base transceiver station (BTS) architectures in a cellular communication network.

Cellular communication systems are well known in the art. In a typical cellular communication system, the mobile stations (MS's) may transmit and receive voice and/or data with the cellular network and one another utilizing radio waves. To facilitate discussion, FIG. 1 depicts the architecture of a cellular communication network 100 that implements the well known Global System for Mobile Communication (GSM) standard. Although the GSM cellular network is chosen herein for illustration purposes, it should be borne in mind that the invention disclosed herein is not limited to any particular standard.

In FIG. 1, there is shown a plurality of mobile stations (MS's) 102, 104, and 106, representing the mobile interface with the cellular users. In a typical network, MS's 102, 104 and 106 may be, for example, mobile handsets or fixed mobile stations mounted in vehicles. MSs 102, 104, and 106 typically include radio and processing functions for exchanging voice and data via radio waves with transceivers (TRX's) in base transceiver stations (BTS's) 114 and 116. The transceivers (TRX's) are shown in FIG. 1 as transceivers 114a, 114b, 114c, 116a, and 116b. The BTS's may be thought of, in one sense, as the counterpart to the MS's within the cellular network, and its main role is to connect the mobile stations with the rest of cellular communication network 100.

There is also shown in FIG. 1 a base station controller (BSC) 118, whose function is to monitor and control the BTS's. There may be any number of BSC I 18 in a network, whose responsibility includes, among other responsibilities, radio interface management, e.g., the allocation and release of radio channels and handover management. Mobile Services Switching Center (MSC) 120 controls one or more BSC's 118 and provides the basic switching function within the cellular network, including setting-up of calls to and from the MS's. MSC 120 also provides the interface between the cellular network users (via the BSC and BTS) and external networks (e.g., PSTN or public switched telephone network). The components of GSM cellular network 100 are well known to those skilled in the art and are not discussed in great detail here for brevity's sake. Additional information pertaining to GSM and the cellular networks implementing the GSM standard may be found in many existing references including, for example, Redl, Weber & Oliphant, An Introduction to GSM (Artech House Publishers, 1995).

In the prior art, the radio circuitries of the TRX's are typically implemented such that they co-locate with other circuits of the BTS. By way of example, FIG. 2 illustrates in greater detail exemplary prior art BTS 114 of FIG. 1, including TRX's 114a, 114b, and 114c. As is typical, the antennas of the prior art TRX's co-locate with the BTS such that the BTS defines the cell. Although one antenna is shown to facilitate simplicity of illustration, separate transmit and receive antennas may be provided for each TRX, as is well known. Other major functional blocks of BTS 114 includes ABIS interface 202, which implements the circuitry necessary for interfacing between BTS 114 and its BSC. CPU circuit 204 implements the call processing functions, including for example LAPDm processing, speech framing, channel coding, interleaving, burst formatting, ciphering, modulation, MS power control and the like. The architecture of the prior art BTS is well known and is not discussed here in great detail for simplicity's sake.

It has been found, however, that the conventional BTS architecture has many disadvantages. By way of example, the integration of the radio circuitries of the TRX's and the processing circuitries of the BTS in one unit results in a complex and maintenance-intensive electronic subsystem. Yet prior art BTS's are often installed in locations selected primarily for optimum radio transmission quality such as on top of buildings and other outdoor structures instead of ease of access. These locations, being exposed to the elements, are typically hostile to the delicate and complex electronic circuits of the prior art BTS. Accordingly, these factors tend to render the installation, maintenance, and upgrade of prior art BTS's difficult and expensive.

The integration of the radio circuitries of the TRX's in the prior art BTS also limits the flexibility with which the cell can be modified to accommodate changes in capacity. In the prior art, the BTS, which contains the co-resident TRX antennas, essentially defines the cell. Although some cell shaping may be accomplished by, for example, employing directional antennas, the cell is more or less limited by the transmit power of the antennas in the BTS. Scaling the transmit power upward increases the cell size at the expense of capacity since the use of larger cells reduces the ability to reuse frequencies among neighboring cells. Increasing the transmit power also increases the amount of heat generated, thereby reducing the reliability of the circuitries in the prior art BTS unless fans and/or additional heat dissipation techniques are employed.

In addition to problems associated with defining a cell, appropriate control of the transmit power of MSs also present a myriad of problems. Ideally, all MSs would transmit at a high enough power providing acceptable signal quality, but low enough where the MSs do not interfere with each other. Thus, upper and lower bounds may be established for the transmit power of the MSs. However, conditions may occur where the transmit power of the MSs fall outside these bounds. Prior art systems have not fully accounted for solving all the situations in which the transmit power of the MSs fall outside the established bounds for transmission.

In view of the foregoing, there are desired improved methods and apparatus for overcoming the disadvantages associated with prior art cellular communication systems.

SUMMARY OF THE INVENTION

To achieve the foregoing and other objects and in accordance with the purpose of the present invention, an improved method and apparatus for controlling the transmit power of a communication device is disclosed.

In one embodiment of the present invention, a first communication device is in communication with a second communication device. The communication may be characterized by a first and a second characteristic that are affected by a transmit power of the first communication device, each characteristic having an upper and a lower bound. If the first characteristic falls below its lower threshold the transmit power of the first communication device is not increased until a predetermined amount of time has expired if the transmit power was previously decreased.

In another embodiment, if the second characteristic falls below its lower threshold the transmit power of the first communication device is not increased until a predetermined amount of time has expired if the transmit power was previously decreased.

In yet another embodiment, if the first characteristic rises above its upper threshold the transmit power of the first communication device is not decreased until a predetermined amount of time has expired if the transmit power was previously increased. In yet another embodiment, if the second characteristic rises above its upper threshold the transmit power of the first communication device is not decreased until a predetermined amount of time has expired if the transmit power was previously increased.

In a further embodiment, the transmit power of the first communication device is delayed from being adjusted to bring the communication within the upper and lower bounds of the first criteria and outside the upper and lower bounds of the second criteria when a contrary adjustment of the transmit power of the first communication device was performed until a predetermined amount of time has expired since the contrary adjustment.

An advantage of the present invention is a significant savings in power consumption. By decreasing the number of times that a communication device is required to increase and/or decrease its transmit power, more power is conserved. This is especially useful in cellular communication systems where mobile communication devices are often times limited by power capacity. Further, the amount of cycling on the communication device is also decreased. These and other features and advantages of the present invention will be presented in more detail in the following specification of the invention and the Figures.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PRESENT INVENTION

In accordance with the present invention, methods and apparatus for reducing repetitive power control situations are described. Generally, by limiting the times at which a base transceiver station may instruct a mobile station to increase or decrease the power at which it is transmitting when a previous power adjust command had instructed the opposite, the ping-ponging effect may be reduced.

A particular problem associated with prior art cellular communication systems is the method by which BTSs 114 and 116 regulate the transmit power of MSs 102, 104 and 106. Typically, the signal received from an MS 102, 104 and 106 received by BTS 114 or 116 is measured by various factors. Signal strength, measured as signal-to-noise ratio, and signal quality, measured as a bit error rate in digital systems, are typically used to define the quality of the signal received from MS 102, 104 or 106. The cellular communication system will have an upper level threshold and a lower level threshold for both signal-tonoise ratio and bit error rate. When a signal received from MS 102, 104 or 106 received by BTS 114 or 116 falls outside the boundaries of the upper or lower threshold, then BTS 114 or 116 must send a signal to MS 102, 104 or 106 in order to adjust the MS's power output. By adjusting the power output of the MS 102, 104 or 106, the signal quality, in terms of signal-to-noise ratio or bit error rate, can be corrected to fall within the appropriate boundaries of the upper and lower thresholds.

Figure 1:
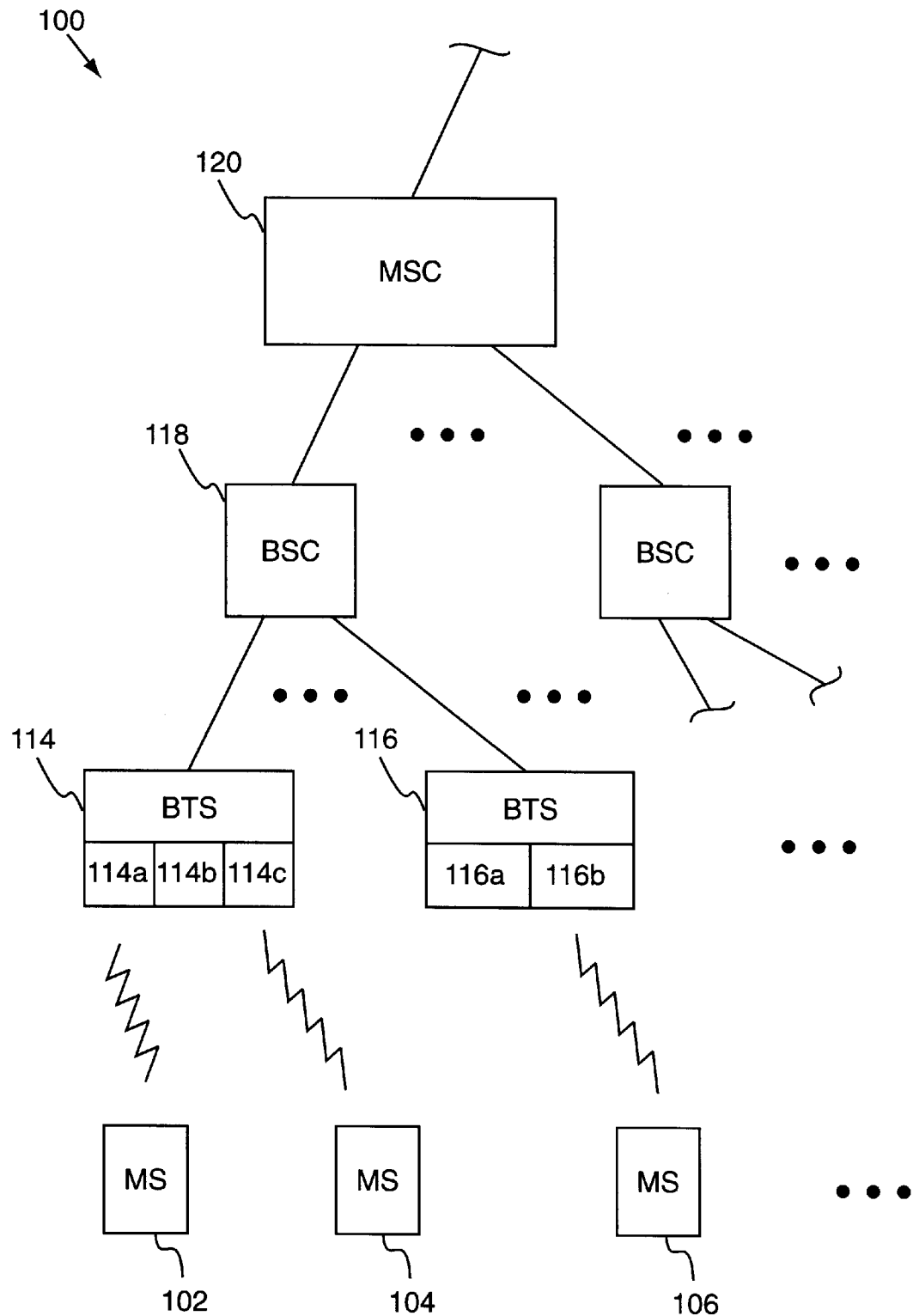
FIG. 1 is a diagrammatic block diagram of a prior art cellular communication system.
Figure 2:
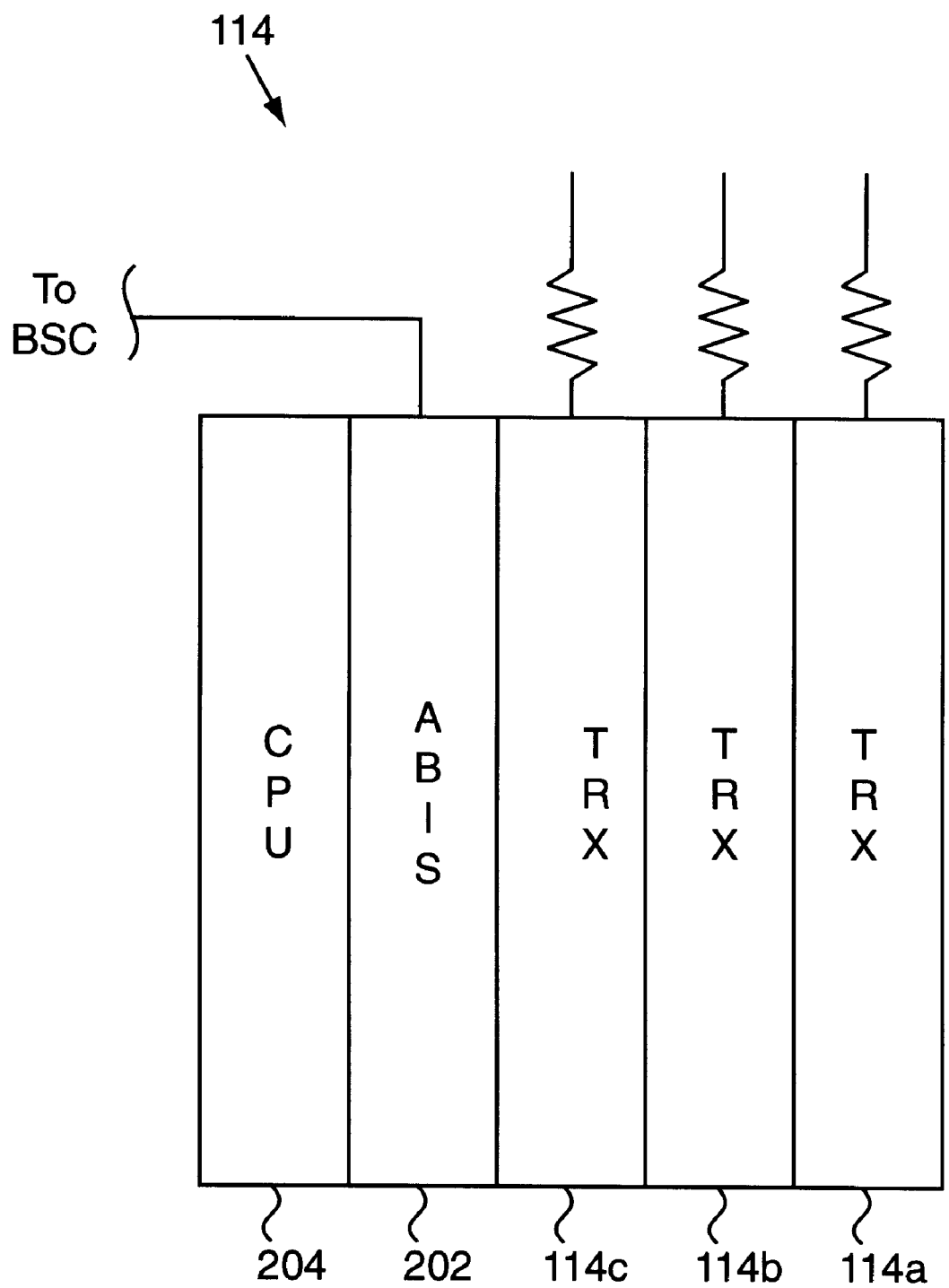
FIG. 2 is a diagrammatic block diagram of a BTS of FIG. 1.
Figure 3:
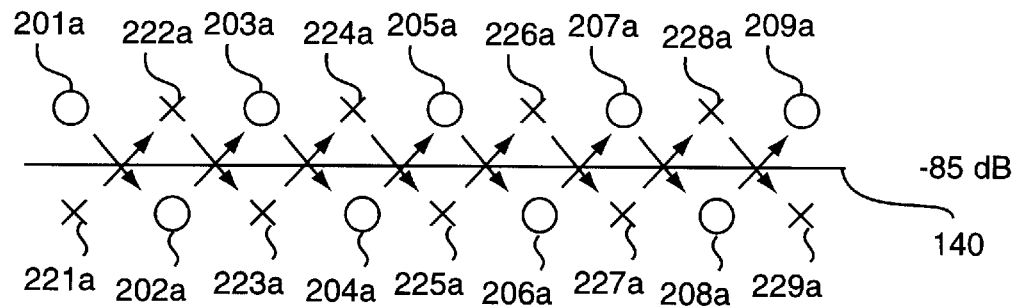
FIG. 3 is a diagrammatic plot of a typical signal-to-noise ratio threshold boundary.
Figure 3:
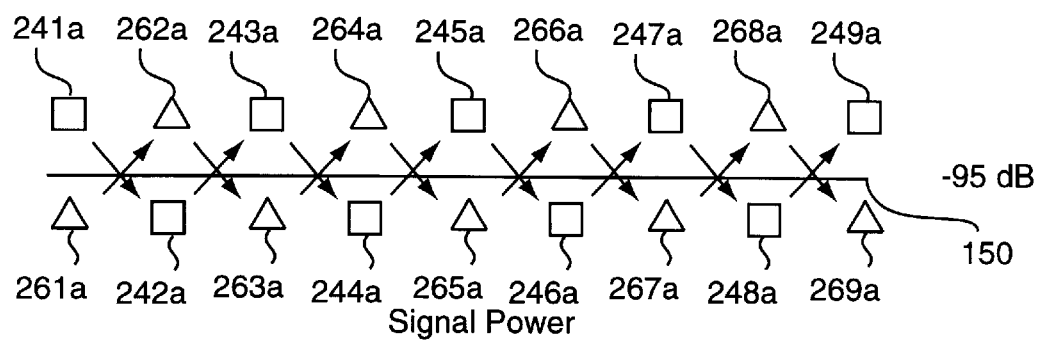
Figure 4:
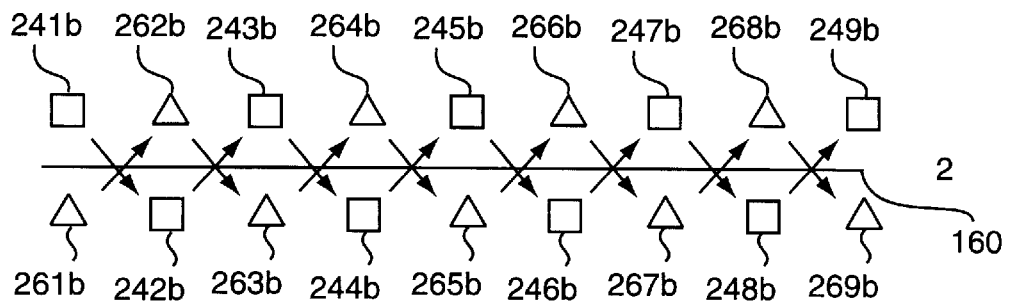
FIG. 4 is a diagrammatic plot of a typical bit error rate threshold boundary.
Figure 4:
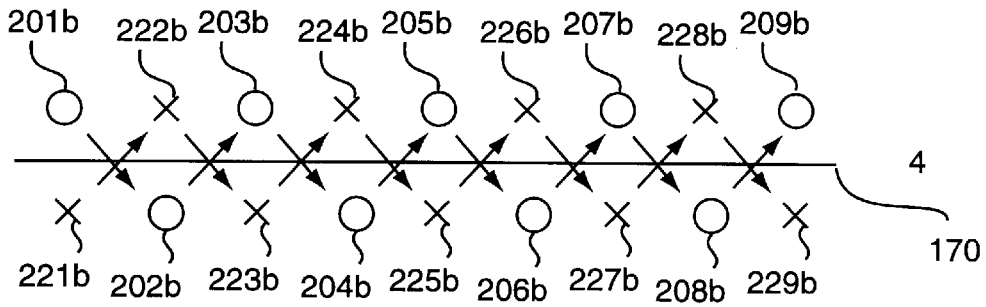

FIGS. 3 and 4 illustrate certain situations in which prior art systems may have difficulty adjusting the power output of MS 102, 104 or 106 to provide a signal that falls within the boundaries of the upper and lower thresholds. FIG. 3 is a diagrammatic plot of a typical signal-to-noise ratio threshold boundary. Upper threshold 140 delineates the maximum power at which MS 102, 104 or 106 should be transmitting. Lower threshold 150 delineates the minimum power at which MS 102, 104 or 106 should be transmitting.

If a signal falls within the boundaries of upper threshold 140 and lower threshold 150, then typically no power adjustment 104 is required to be sent to MS 102, 104 or 106. Should a received signal from MS 102, 104 or 106 be received by TRX 114 or 116 that falls outside the boundaries of upper threshold 104 and lower threshold 150, a power adjustment signal is typically then sent to the MS. For example, signal sample point 201a lies above upper threshold 104. Therefore, the corresponding MS (e.g., 102) sending signal 201a, must then be sent a power adjustment signal in order to reduce its power. Generally, the power adjustment signal will have been received by MS 102, and the power output of the MS will be reduced as depicted in the new sample point 202a. In most cases, that will solve the power transmission problem, however, in certain situations, the corresponding BTS (e.g., 114) may be prompted to immediately send another power adjustment signal, increasing the power output of MS 102.

Typically, the reason for BTS 114 to send a new power adjustment signal that may raise the power output of MS 102 beyond upper threshold 140 again, as depicted in sample point 203a, is related to other signal quality criteria, such as the bit error rate. FIG. 4 illustrates a bit error rate diagram having a bit error rate upper threshold 160 and a bit error rate lower threshold 170.

In FIG. 4, bit error rate upper and lower threshold 160 and 170 are indicated by quality levels 2 and 4. These quality levels are outlined in GSM specification 05.08, Version 4.9.0, dated Apr. 15, 1994, which is incorporated herein by reference. Basically, bit error rate quality levels indicate the quality of the digital signal received from MS 102, by BTS 114. The bit error rate quality levels range from 0 to 7, the lower the bit error rate level, the lower the number of bit errors per symbol received by BTS 114 or 116. Thus, referring back to FIG. 4, if a signal falls within the bit, error rate thresholds 160 and 170, then the signal received from MS 102 by BTS 114 has an acceptable number of bit errors per symbol, such that BTS 114 or 116 may properly process the incoming signal.

When a signal received by BTS 114 or 116 falls above bit error rate upper threshold 160, it typically indicates that the signal quality is too good. That is, due to the fact that most cellular communication systems incorporate error encoding, a number of bit errors are acceptable in any transmission. If a signal received by BTS 114 or 116 has an inordinately low number of bit errors, falling above bit error rate upper threshold level 160, then BTS 114 may be able to reduce the power at which MS 102 is transmitting. Thus, MS 102 may afford to transmit with more errors, corresponding to a lower transmit power level.

For example, signal sample point 241*b* falls above bit error rate upper threshold 160. Thus, BTS 114 may be prompted to send a power adjustment signal to MS 102 to reduce the signal power since it may be likely that MS 102 may be able to transmit at a lower power and incur a few more bit errors per sample, and fall within the appropriate bit error rate threshold. Similarly, if a signal received by BTS 114 should happen to fall below bit error rate lower threshold 170, then BTS 114 may send a power adjustment signal to MS 102 to increase its power such that a better bit error rate ratio may be obtained and fall within the bit error rate threshold.

In certain situations, the combination of the signal strength, signal-to-noise ratio, and signal quality, bit error rate, may induce BTS 114 to repeatedly send power adjustment signals to increase and decrease the power output of MS 102, as illustrated in FIGS. 3 and 4.

FIGS. 3 and 4 include four series of signal sample points. Signal sample points with the same reference numeral, i.e., 201*a* and 201*b*, represent the signal-to-noise ratio and the bit error rate for a single signal sample point, respectively. That is, a single signal sample point 201*a* is the signal-to-noise ratio of measurement, and 201*b* is the bit error rate measurement.

Signal sample points having sequential numbers indicate the successive signal sample points in relation to a particular MS 102, 104 or 106. For example, 201*a* is a first signal sample point for a particular MS (e.g., 102), and the following signal sample points in the sequence 202*a*, 203*a*, 204*a*, 205*a*, 206*a*, 207*a*, 208*a*, and 209*a* are the successive signal sample points after power adjustment signals have been sent by BTS 114 or 116 to the particular MS, in this case 102. Analogously, signal sample points 201*b* through 209*b* indicate the successive bit error rate signal sample points during another exemplary communication between a particular MS and a BTS, e.g., 102 and 114.

Referring to signal sample point series 201*a* through 209*a* and 201*b* through 209*b*, a ping-pong situation, as discussed earlier, will be described. Signal sample points 201*a* and 201*b* indicate a situation where MS 102 may be transmitting at a power greater than signalto-noise ratio upper threshold 140, but at a signal quality that falls within the bit error rate upper and lower threshold 160 and 170*g* respectively.

Typically, prior art systems may send a power adjustment signal to MS 102 to decrease its power output since it is transmitting beyond the maximum power threshold 140. After MS 102 has reduced the power at which it is transmitting, a new signal sample point set 202*a* and 202*b* may be measured by BTS 114. The new signal sample points 202*a* and 202*b* indicate that, although the transmit power of MS 102 now falls within the boundary of the signal-to-noise ratio threshold 140 and 150, the signal quality has now fallen below the bit error rate lower threshold 170.

Normally, BTS 114 may then send a power adjustment signal to MS 102 to increase the power at which MS 102 is transmitting in order to correct the bit error rate problem. Once MS 102 has increased its power, a new set of signal sample points 203*a* and 203*b* may be measured by BTS 114. Signal sample points 203*a* and 203*b* present a similar problem as indicated by signal points 201*a* and 201*b*. That is, although the signal quality falls within the appropriate threshold 160 and 170, the signal strength is once again too high and falls above signal-to-noise ratio threshold 140.

Generally, in prior art cellular communication systems, BTS 114 may repeat a power adjustment signal to decrease the power at which MS 102 is transmitting. Again, we are met with the situation where the signal-to-noise ratio of the signal from MS 102 is adequate, but the signal quality falls below bit error rate lower threshold. Prior art cellular communication systems may continue to repeat this process of increasing and decreasing the power at which MS 102 is transmitting in order to attempt to correct this paradoxical situation where one criteria can only be met by violating another signal criteria.

Signal sample points 221*a* through 229*a*, 221*b* through 229*b*, 241*a* through 249*a*, 241*b* through 249*b*, 261*a* through 269*a*, and 261*b* through 269*b* illustrate other situations in which this ping-pong effect may occur in prior art cellular communication systems.

Ping-ponging the power at which MS 102 is transmitting, may have several disadvantages. A primary concern is that additional power consumption caused by the repeated increase and decrease of the power at which MS 102 is transmitting. Additionally, ping-ponging may affect the overall communication between MS 102 and BTS 114. Further, the cycling of the power at which MS 102 is transmitting may affect the lifespan of MS 102.

While one embodiment of the present invention is described in terms of a cellular communication system, the present invention encompasses any type of communication systems where the transmit power of the communicating devices may be changed. Wireless communication systems utilizing electromagnetic radiation as the communication medium particularly fall within the scope of the present invention. However, the present invention may be suitable for application to wired communication systems as well.

In one embodiment of the present invention, the types of power adjustment signals a BTS may send to a mobile station may be limited by timing the interval between the last time that the BTS has sent a contrary power adjustment signal. That is, if a BTS sends a power adjustment signal to a MS to increase the power at which it is transmitting, the base transceiver station may then be prevented from sending a power adjustment signal to decrease the MS's transmit power until a predetermined time interval has passed. Similarly, when the base transceiver station has sent a power adjustment signal or command to decrease the power at which a mobile station is transmitting, the BTS may then be limited from sending an increase power command until a predetermined interval of time has passed.

Figure 5:
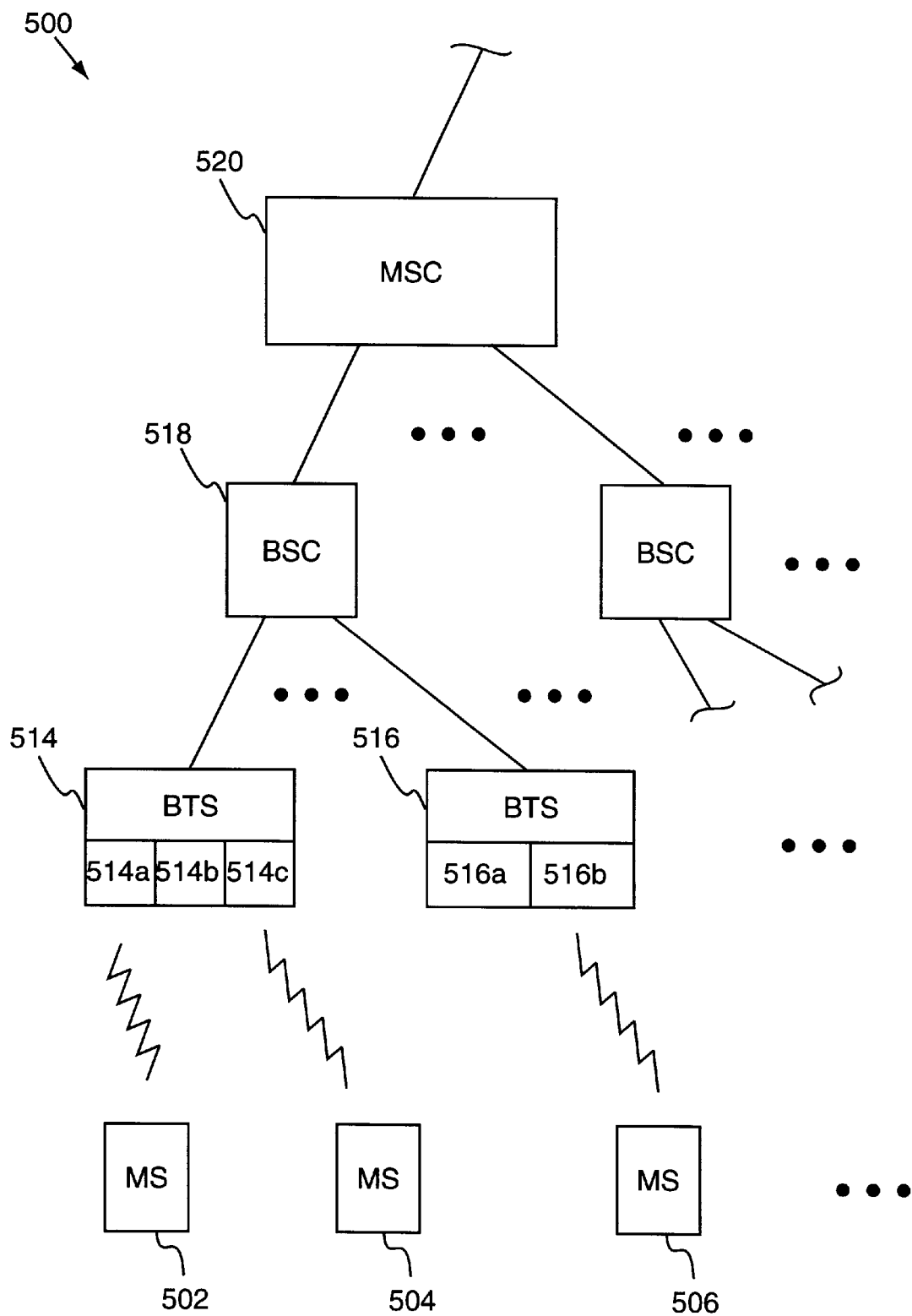
FIG. 5 is a diagrammatic block diagram of an improved communication system in accordance with one embodiment of the present invention

FIG. 5 is a diagrammatic block diagram of an improved cellular communication system 500 in accordance with one embodiment of the present invention. Improved cellular communication system 500 includes an MSC 520, BSC 518, and a number of BTS's 514 and 516. Improved cellular communication system 500 further includes MSs 502, 504, and 506.

As discussed, MSs 502, 504 and 506 are in communication with BTS's 514 and 516 via transceivers 514*a*, 514*b*, 514*c*, 516*a* and 516*b*. Typically, MSs 502, 504 and 506 communicate with BTS's 514 and 516 through the electromagnetic spectrum, as known in the art. Unlike prior art systems, improved cellular communication system 500 facilitates communication between MSs 502, 504 and 506, with BTS's 514 and 516 with minimized repetitive ping-ponging of the MS's transmit power.

Figure 6:
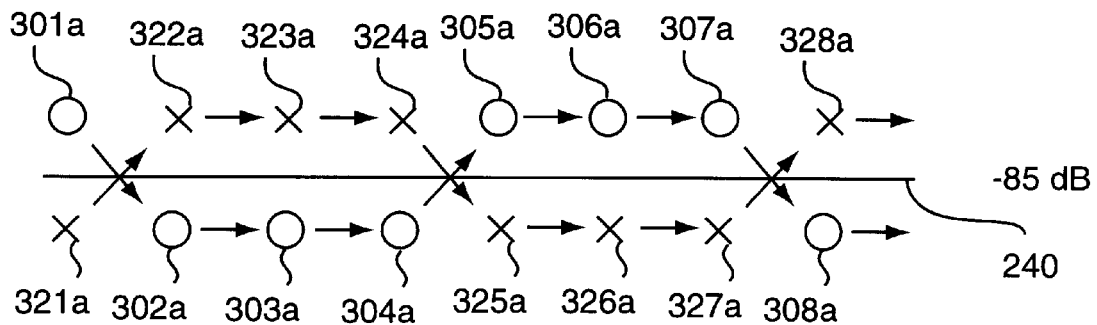
FIG. 6 is a diagrammatic plot of a typical signal-to-noise ratio threshold boundary, in accordance with one embodiment of the present invention.
Figure 6:
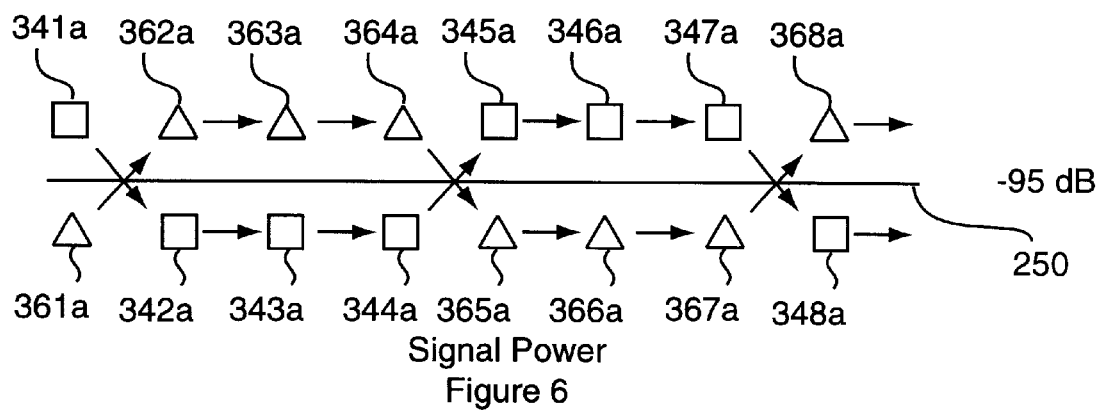
Figure 7:
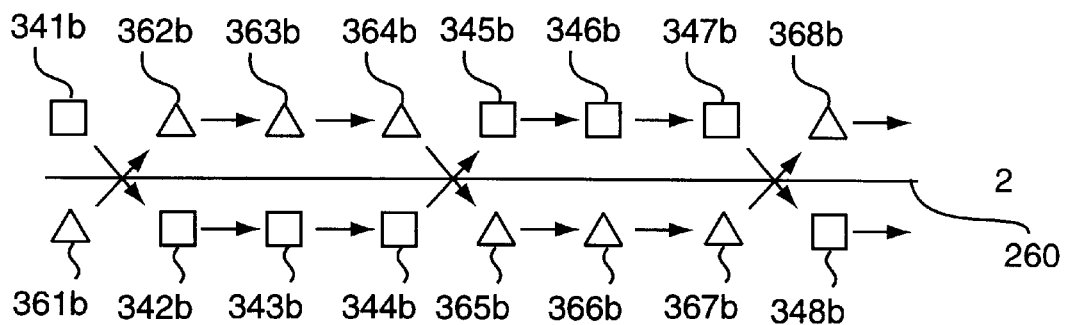
FIG. 7 is a diagrammatic plot of a typical bit error rate threshold boundary, in accordance with one embodiment of the present invention.
Figure 7:
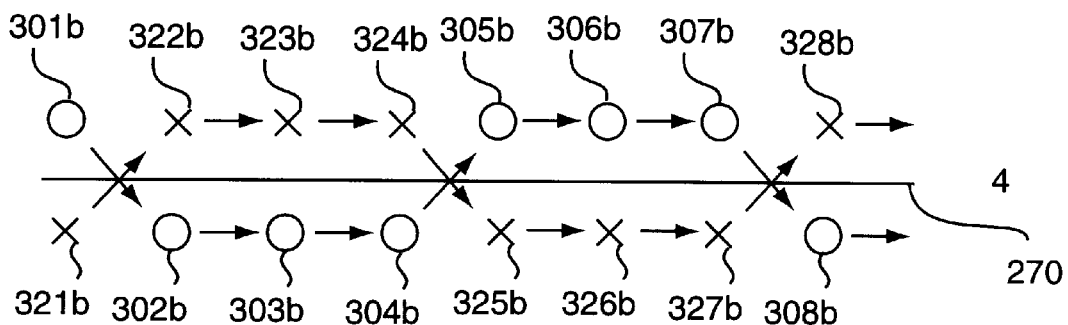

FIGS. 6 and 7 depict signal power and quality factor diagrams, respectively, in accordance with one embodiment of the present invention. Signal sample point set representing a series of cellular communications, are depicted by the different shapes as seen in FIGS. 6 and 7. One series of signal sample points (e.g., 301*a* through 308*a*), represents one series of signal sample points between a BTS and a MS 502, 504 or 506.

Improved cellular communication system 500 typically sets thresholds 240, 250, 260 and 270 for signal power and quality factors of a signal being received from a MS 502. Referring to FIG. 6, upper signal power threshold 240 is set at a predetermined level. Further, lower signal power threshold 250 is typically also set at another predetermined level. The predetermined levels are dependent on the power outputs of MS 502 and the arrangement of the cell in which improved cellular communication system 500 is operating, and various other factors. In one embodiment, upper signal power threshold is set at minus 85 dB and lower signal power threshold is set at minus 95 dB.

Referring to FIG. 7, improved cellular communication system 500 also typically sets predetermined quality factor levels, such as upper signal quality factor threshold 260 and lower quality factor threshold 270. As discussed, the GSM specification includes a range of quality factor levels ranging from 0 to 7. In one embodiment of the present invention, upper quality factor threshold level is set at 2 and lower quality factor level is set at 4. However, any quality factor level may be chosen for upper quality factor level or theshold 260 and lower quality factor level or threshold 270, as long as upper quality factor level 260 is greater than lower quality factor level 270.

For purposes of brevity, further discussion of a communication will be in reference to communications between BTS 514 and MS 502. Signal sample points 301*b* through 328*b* of FIG. 7 correspond to sample points 301 a through 308*a*, but represent the quality factor of the same signal as opposed to the signal power as depicted in FIG. 6. The other signal sample point sets depicted by the other shapes in FIGS. 6 and 7 represent different situations in which MS 502 and BTS 514 are communicating.

Referring back to FIGS. 3 and 4, it can be appreciated that the starting signal sample points 301*a* and 301*b*, 321*a* and 321*b*, 341*a* and 341*b*, and 361*a* and 361*b*, represent situations in which ping-ponging may have occurred in prior art systems. However, in improved cellular communication system 500, ping-ponging is avoided by limiting BTS 514 from sending successive contrary power adjustment signals. For example, signal sample points 301*a* and 301*b* represent the situation where the signal power of a signal from MS 502 to BTS 514, is too strong.

In prior art systems, the BTS would have sent a signal to the mobile station to reduce the power of its transmission. In that case, the signal of the mobile station would be represented by signal sample points 302*a* and 302*b* where, although the signal power falls within the appropriate threshold as depicted by signal sample point 302*a*, the signal quality factor level falls below the signal quality lower threshold threshold 270 as depicted by signal sample point 302*b*. In prior art systems, the BTS may then have sent a signal to increase the transmit power of MS 502 in order to bring back the signal quality factor above lower quality factor threshold 270. In one embodiment of the present invention, BTS 514 is typically not allowed to send a power adjustment signal to MS 502 to increase its transmitting power to avoid further ping-ponging.

Rather than having BTS 514 send a power adjustment signal to a MS 502 to increase its power from the situation depicted in signal sample points 302*a* and 302*b*, BTS 514 may determine the optimal time to allow MS 502 to increase its transmitting power in order to correct the low signal quality level. At the same time, BTS 514 typically avoids power fluctuations which would occur had ping-ponging been initiated.

The signal from MS 502 to BTS 514 remains at the same level as depicted in 302*a* and 302*b* for a certain interval of time, as depicted by signal sample points 303*a*, 303*b*, 304*a* and 304*b* of FIGS. 6 and 7. Typically, the intervals between signal sample points, for example, the time interval between 303*a* and 304*a*, are predetermined increments of time in which BTS typically sends a power adjustment signal to MS 502. Thus, in a situation depicted by signal sample point 302*a* through 304*a* and 302*b* through 304*b*, BTS 514 may wait two sample intervals before sending a power adjustment signal to MS 502 to increase its transmit power.

MS 502 typically increases its transmit power as soon as it receives the signal received from MS 502 by BTS 514 as represented by signal sample point 305*a* and 305*b*. Again, the situation occurs where the signal power is greater than the upper signal power threshold 240. However, the quality factor of the signal falls within the appropriate thresholds 260 and 270. Rather than BTS 514 sending an immediate signal to MS 502 to decrease the transmit power, BTS 514 may again wait in order to avoid the deleterious effects of ping-ponging.

In the example illustrated in FIGS. 6 and 7, BTS 514 waits two time intervals before sending a power adjustment signal to MS 502 to decrease its transmit power, as depicted by signal sample points 306*a* and 306*b*, 307*a* and 307*b*, and 308*a* and 308*b*. Similarly, improved cellular communication system 500 handles the other situations where ping-ponging typically occurs as depicted by signal sample points 321*a* and b through 328*a* and b, 341*a* and b through 348*a* and b, and 361*a* and b through 318*a* and *b*. However, the present invention is not limited to the exemplary situations of ping-ponging disclosed in FIGS. 6 and 7, but is suitable to remedy any situation in which the transmit power of MS 502 is required to be repeatedly increased and decreased due to certain signal criteria.

Figure 8:
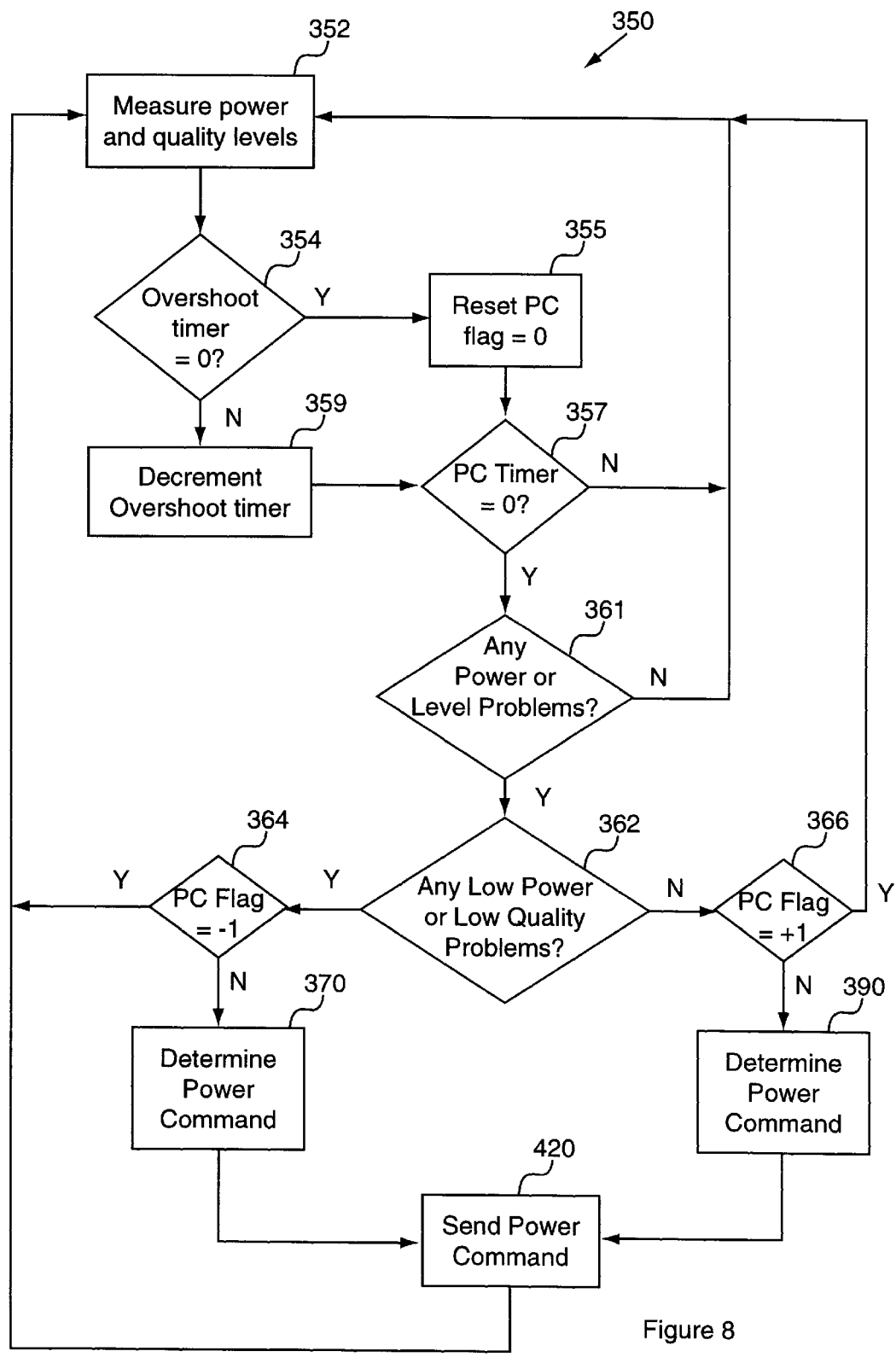
FIG. 8 is a diagrammatic flowchart of the operation of an improved communication system, in accordance with one embodiment of the present invention.

FIG. 8 is a diagrammatic flowchart 350 of the operation of an improved cellular communication system, in accordance with one embodiment of the present invention. The illustrated operations may be performed by any suitable element of improved cellular communication system 500. For example, an MSC, BSC or BTS may perform the exemplary operations. In one embodiment, a CPU (not shown) of BTS 514 performs the operations depicted in flowchart 350.

Flowchart 350 typically begins at block 352, in which BTS measures the signal received from MS 502 for the relevant signal criteria. The signal criteria may be any suitable criteria relevant to cellular communication systems. By way of example, the criteria may include the signal power as measured by signal-to-noise ratio, bit error rate, intersymbol interference, crosstalk or any other suitable signal characteristic. In one embodiment, the signal power, as measured by signal-to-noise ratio and the bit error rate, are used as the signal criteria.

In one embodiment, after the signal power and the bit error rate have been measured in block 352, BTS 514 determines whether an overshoot timer is equal to zero in block 354. The overshoot timer typically indicates the amount of time that has passed from the last power adjustment signal that caused one of the criteria, in this case signal power or bit error rate, to overshoot one of the thresholds (e.g., 240, 250, 260 and 270 of FIGS. 6 and 7). If a previous power adjustment signal had caused the signal from MS 502 to overshoot one of the thresholds 240, 250, 260 and 270, then BTS 514 must determine whether a sufficient amount of time has expired before sending a contrary power adjustment signal. If the overshoot timer is equal to zero, then BTS 514 proceeds to block 355 where PC flag is set to zero.

PC flag determines what type of overshoot occurred because of the previous power adjustment signal. If PC flag is equal to positive one (+1) then it means that the previous power adjustment signal went below lower signal power threshold 250. If PC flag is equal to negative one (-1), then the previous power adjustment signal caused the signal power of MS 502 to go over upper signal power threshold 240. As may be appreciated, the PC flag need only inform BTS 514 of whether the signal power went over or under the threshold 240 and 250 since ping-ponging only occurs when the signal power, or the quality factors for bit error rates, alternately goes above and below the respective threshold. After setting the PC flag to zero in block 355, BTS 514 proceeds to block 357 to determine whether PC timer is equal to zero.

PC timer may be a timer to measure the time intervals between consecutive signal sample points (for example, between 302a and 303a, referring back to FIG. 6). The PC timer time interval may be set to any suitable time increment. By way of example, in one embodiment, power measurements as discussed in reference to block 352, are taken every half second.

However, the time interval represented by PC timer may represent several measurement intervals. For example, although power signal measurements are taken every half second, BTS 514 may only want to send power adjustment signals to MS 502 every three seconds. In that case, BTS 514 would count down to every sixth measurement intervals before sending any type of power adjustment signal. If the PC timer is not equal to zero, then the flowchart 350 returns to block 352 to take further signal measurements. If the PC timer is equal to zero, then BTS 514 may proceed.

Referring back to block 354, if the overshoot timer is not equal to zero, then flowchart 350 proceeds to block 359 where BTS 514 decrements the overshoot timer. After the overshoot timer has been decremented in block 359, BTS 514 proceeds to block 357 as described earlier.

Should PC timer be equal to zero, indicating that it is an appropriate time to send a new power adjustment signal, BTS 514 proceeds to block 361. In block 361, BTS 514 determines if there are any problems related to the selected criteria. In one embodiment, BTS 514 checks to determine whether the signal power falls outside threshold 240 and 250, or if the signal quality falls outside threshold 260 and 270, in block 361. If there are no problems with the signal being transmitted by MS 502, then BTS 514 returns to block 352 to take further measurements. If there are problems with the signal related to one of the selected criteria, then BTS 514 proceeds to block 362.

In block 362, BTS 514 determines if the signal from MS 502 falls below any of the lower thresholds 250 or 270 in terms of signal power or bit error rate, respectively. Typically, it is preferred to handle any problems related to lower thresholds 250 or 270 before handling any problems related to the upper threshold 240 and 260. Generally, this is because when the signal from MS 502 falls below a lower threshold 250 or 270, the signal is either too low in power or contains too many bit errors per signal. In those cases, the communication between MS 502 and BTS 514 can be seriously affected. However, if the signal power or the quality of the signal surpasses an upper threshold 240 or 260, respectively, then the only problem is that MS 502 is either transmitting at too high a power or the signal quality is high enough such that lower power may be used and still maintain adequate communication between MS 502 and BTS 514.

If it is determined that the signal power or the quality factor of the signal from MS 502 falls below one of the lower thresholds 250 or 270, then the operation of BTS 514 proceeds to block 364. In block 364, BTS 514 determines if PC flag equals negative one. As discussed, if PC flag equals negative one, it means that the previous power adjustment signal caused the signal power to fall below lower signal power threshold 250. If the PC flag is still negative one, then the overshoot timer for the previous power adjustment signal has not expired. If PC flag is not equal to negative one, then either the PC flag was reset indicating that the overshoot timer has expired, or the previous power adjustment signal caused the signal power to go over upper signal power threshold 240.

If PC flag is equal to negative one, then BTS 514 proceeds back to block 352 for further signal measurement. If PC flag is not equal to negative one, then BTS 514 proceeds to block 370 where BTS 514 determines the appropriate power command to send to MS 502, as discussed in further detail in reference to FIG. 9. After the appropriate power command has been determined, it is then sent to MS 502 in block 420. After the power command is sent to MS 502, BTS 514 returns to block 352 for further signal measurement.

Referring back to block 362, if there were no problems with the signal power falling below lower signal power threshold 250 or the signal quality falling below lower quality factor level 270, then BTS 514 proceeds to block 366. In block 366, BTS 514 determines whether the PC flag is equal to positive one. Analogous to block 364, if PC flag is equal to positive one, it indicates that the previous power adjustment signal sent by BTS 514 to MS 502 caused the signal power to exceed upper signal power threshold 240. In which case, BTS 514 returns to block 352 for further signal measurements.

If PC flag is not equal to positive one, then it indicates that the PC flag was either reset to zero or the previous power adjustment signal was a signal to MS 502 to decrease its transmit power, which would not affect the current determination. BTS 514 then proceeds to block 390 and determines the appropriate power adjustment command to send to MS 502, as discussed in further detail in reference to FIG. 10. Once the appropriate power adjustment signal has been determined by BTS 514, it is sent to MS 502 in block 420. After the power adjustment signal is sent to MS 502, BTS 514 returns to block 352 for further signal measurements.

Figure 9:
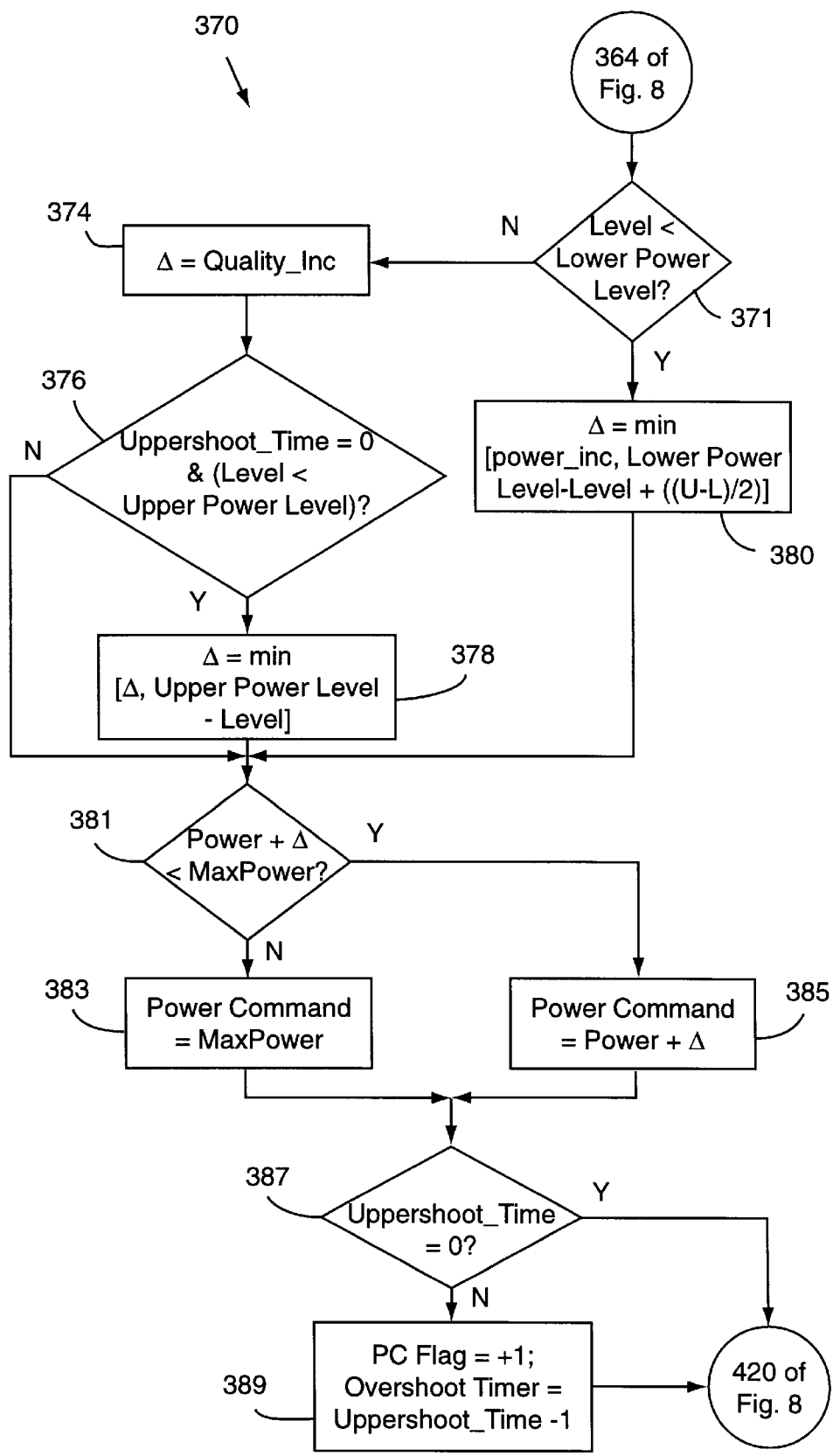
FIG. 9 is a diagrammatic flowchart of block 370 of FIG. 8.

FIG. 9 is a diagrammatic flowchart of block 370 of FIG. 8. In block 370 BTS 514 determines the appropriate power command to be sent to MS 502 when a lower threshold problem is present. Flowchart 370 proceeds from block 364 of FIG. 8 to block 371. In block 371, BTS 514 determines whether the current signal power level is less than the lower signal power level threshold 250. If the current signal power level is less than the lower signal power level threshold 250, then BTS 514 proceeds to block 380 to determine an appropriate power increment delta.

The power increment delta, in block 380, is set as the minimum of a predetermined signal power increment step, power_increment, or the value of the lower signal power level threshold 250 minus the current level, plus one-half the difference of the upper threshold level 240 minus the lower threshold level 250, as represented by the following formula.

$$\Delta=\min\,[(power\_increment),\,lower\,threshold\,\mathbf{250}-current\,level+\\((upper\,threshold\,\mathbf{240}-lower\,threshold\,\mathbf{250})\div 2)]$$

Referring back to block 371, if the current level was not less than the lower signal power level threshold 250, then the current lower threshold problem is not due to signal power, but to the quality factor. That is, the bit error rate of the signal from MS 502 to BTS 514 is too high, and the quality factor of the signal falls below lower quality factor threshold 270. In that case, BTS 514 proceeds to block 374 where the power increment is set at a predetermined power increment related to poor signal quality, quality_increment.

In one embodiment, a predetermined step may be set for the increment or decrement related to the quality factor and the increment or decrement related to the signal power. By way of example, a power related increment, power_increment, and a power related decrement, power_decrement may be set at 2 dB. By way of further example, a quality related increment, quality_increment, and a quality related decrement, quality_decrements may be set at 2 dB. However, any suitable increment or decrement may be utilized in accordance with the present invention.

After the delta increment has been set to quality_increment in block 374, BTS 514 proceeds to block 376. In block 376 BTS 514 determines whether an overshoot or upper shoot time constant has been set to zero, and whether the current power level is less than the upper signal power threshold 240. The upper shoot time constant determines whether overshoots are allowed at all by BTS 514, as indicated by its value. If the upper shoot time constant is equal to zero, then BTS 514 is not permitted to send a power adjustment signal to MS 502 that would increase the signal power beyond upper signal power threshold 240.

If upper shoot time constant is a value greater than zero, then that value will allow BTS 514 to send a power adjustment signal that would send the signal power beyond upper signal power threshold 240. The upper shoot time constant also informs BTS 514 for how long it may remain above upper signal power threshold 240 before being allowed to correct the overshoot.

In block 376, in addition to determining if the overshoot time constant is equal to zero or not, BTS 514 also determines whether the current power level is less than the upper signal power level threshold 240. If either of the two criteria are false, then BTS 514 proceeds to block 381 with the delta increment being equal to the predetermined quality increment.

If both of the two criteria are true, then BTS 514 proceeds to block 378 to determine the delta increment. The delta increment is set at the minimum of either the current value of delta, which would be equal to quality_increment, or the value returned by the equation: upper signal power threshold level 240 minus the current power level.

After the delta increment has been set by either the blocks 374, 378 or 380, BTS 514 proceeds to block 381. In block 381, BTS 514 determines whether the current power plus the incremental delta power adjustment will be lower than the maximum power output capable by MS 502. If the delta increment plus the current power is less than the maximum power, then the power adjustment command is set to that sum in block 385. However, if current power plus the delta increment is equal to or exceeds the maximum power capable by MS 502, then the power adjustment command is set to the maximum power level in block 383. After the power adjustment commands have been determined in blocks 383 or 385, BTS proceeds to block 387.

In block 387, BTS 514 once again determines if the upper shoot time constant is not equal to zero, allowing overshoot. If the upper shoot time constant is equal to zero, then the power adjustment command is sent in block 420 of FIG. 8 without setting either the PC flag or the overshoot timer, since the power adjustment command will not have caused an overshoot.

However, if upper shoot time constant is not equal to zero, then the power adjustment command may have set the signal power beyond the upper signal power threshold 240. In which case, BTS 514 proceeds to block 389 to set the PC flag equal to positive one indicating that a power adjustment signal has been sent to MS 502 that might have sent the signal power beyond upper signal power threshold 240. At the same time, the overshoot timer is set at the upper shoot time constant minus one in order to set the time interval in which the signal power of the mobile station should not be decremented if the signal power exceeds upper signal power threshold 240. After the appropriate values have been set in block 389, BTS proceeds to block 420 of FIG. 8 where the power adjustment signal command is sent to MS 502.

In the preceding, BTS 514 has determined the appropriate power adjustment command to send to MS 502 in order to rectify one of two problems. The two problems either being that the signal power of the signal from MS 502 is lower than lower signal power threshold 250, or that the quality of the signal is less than the lower quality factor threshold 270. In either case, if it is determined that in order to resolve one of the two problems, that the signal power should be incremented beyond upper signal power threshold 240, then BTS 514 will have sent the appropriate power increment command but at the same time, set the overshoot timer such that an immediate successive command to decrease power is not sent immediately after the command to increase power. Also, the situation where BTS 514 is not allowed to go beyond upper signal power threshold 240, will typically also have been complied with.

Figure 10:
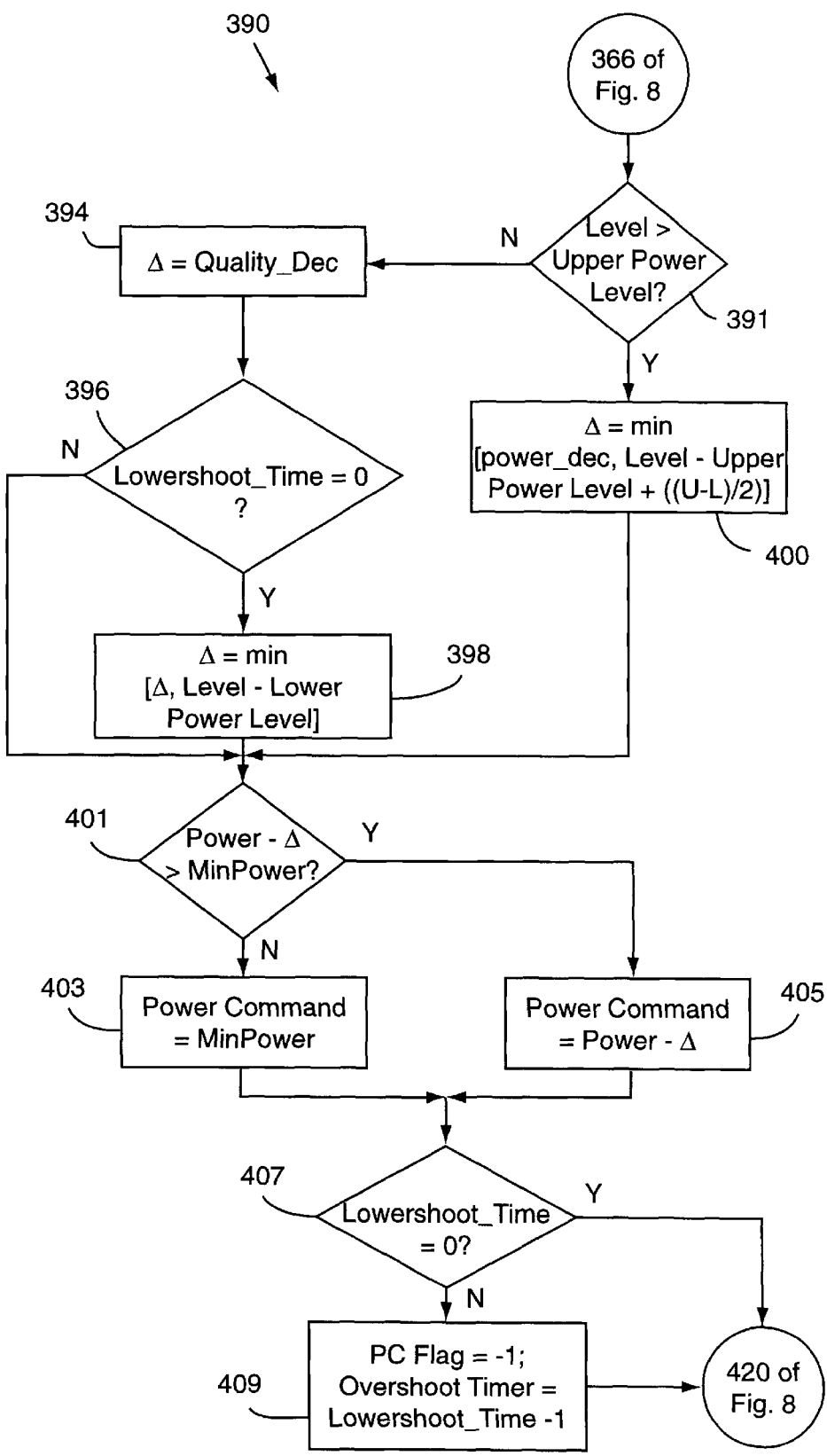
FIG. 10 is a diagrammatic flowchart of block 390 of FIG. 8.

FIG. 10 is a diagrammatic flowchart of block 390 of FIG. 8. Flowchart 390 determines a power adjustment command when the signal power or the signal quality exceeds upper threshold 240 or 260. Flowchart 390 proceeds from block 366 of FIG. 8 to block 391.

In block 391, BTS 514 determines whether the current power level is greater than the upper signal power level threshold 240. If the current signal power level is greater than the upper signal power level threshold 240, BTS 514 proceeds to block 400, in which BTS 514 determines the delta decrement. The delta decrement is equal to the minimum of either the power$_{13}$ decrement, or the current power level minus upper power level 240 plus one half the difference between upper power level 240 and lower power level 250, as represented in the following equation.

$$\Delta=\min\,[(power\,decrement),\,current\,level\_upper\,threshold\,\mathbf{240}+\\((upper\,threshold\,\mathbf{240}-lower\,threshold\,\mathbf{250})\div 2)]$$

If the current signal power level is equal to or less than the upper signal power level threshold 240, then BTS 514 proceeds to block 394. In block 394, the delta decrement is set to the predetermined step decrement related to quality factor, quality_decrement. Once the delta decrement has been set in block 394, BTS 514 proceeds to block 396 to determine if the lower shoot time constant is set to zero.

The lower shoot time constant indicates whether BTS 514 is permitted to go below lower signal power level threshold 250. If the lower shoot time constant is equal to zero, then BTS 514 is not permitted to go below lower signal power threshold 250. If the lower shoot time constant is greater than zero, then the value indicates that BTS 514 is allowed to go below lower signal power threshold 250 and for how long.

If the lower shoot time constant is not equal to zero, then the delta increment remains the value set in 394, the predetermined step quality decrement, and the BTS 514 proceeds to block 401. On the other hand, if the lower shoot time constant is equal to zero, then BTS 514 proceeds to block 398 where the delta decrement is determined. In block 398, the delta decrement is set at either the minimum of the current value for the delta decrement, which would be equal to quality_decrement, or the current level minus lower power level threshold 250, as represented by the following equation.

$$\Delta = \min[\text{quality decrement, current level} - \text{lower power level threshold}]$$

After the delta decrement has been set in either blocks 394, 398 or 400 BTS 514 proceeds to block 401. In block 401, BTS 514 determines whether the current power minus the delta decrement is greater than the minimum power at which MS 502 may transmit. If the current power minus the delta decrement is greater than the minimum power, then the power adjustment command is set at that value set in block 405. Otherwise, if the current power minus the delta decrement is equal to or falls below the minimum power, then the power adjustment command is set to that minimum power level in block 403.

Block 405 sets the power adjustment command to the current power minus the delta decrement. Block 403 sets the power adjustment command to the minimum power at which MS 502 may transmit. After the power adjustment command has been determined in either blocks 403 or 405, BTS 514 proceeds to block 407.

In block 407, BTS 514 determines again whether the lower shoot time constant is equal to zero or not. If the lower shoot time constant is equal to zero no lower shoot is permitted. The power adjustment command should not have gone beyond the lower signal power level threshold 250 due to blocks 396 and 398. The power adjustment command is then sent in block 420 of FIG. 8.

In the other case, where lower shoot time constant is not equal to zero, then BTS 514 proceeds to block 409. In block 409, BTS 514 sets the PC flag equal to minus one, indicating that the power adjustment command decreasing the signal power may have sent the signal power below lower signal power threshold 250. At the same time, the overshoot timer is also set to the lower shoot time constant minus one, such that BTS 514 will be able to determine when to allow an increase in the transmit power of MS 502 to occur. After the appropriate values have been set in block 409, BTS 514 proceeds to block 420 of FIG. 8.

In block 420, BTS 514 sends the appropriate power adjustment command to MS 502. As may be appreciated, once a power adjustment command has been sent by BTS 514 instructing MS 502 to increase or decrease its signal power such that it will exceed one of the signal power thresholds, BTS 514 will not immediately send a following command contrary to the one just sent. That is, BTS 514 will not cause a ping-ponging effect to occur as described in prior art systems. Rather, BTS 514 in accordance with the present invention, will delay any contrary signals to the previous power adjustment signal in order to avoid ping-ponging.

One embodiment of the present invention, as discussed above, deals in particularity with cellular communication systems utilizing GSM specifications. However, the present invention may be utilized in any suitable type of communication systems.

A novel aspect of the present invention is the concept of timed transmit power adjustments of conflicting commands. Repeatedly increasing and then immediately decreasing the transmit power of a mobile unit, or any communication device, in order to comply with conflicting criteria may have detrimental effects on the mobile unit without satisfying all the criteria. Thus, a method and apparatus of minimizing repetitive contrary commands reduces the amount of harm caused by more frequent ping-ponging when all criteria cannot be met. At the same time, the timed intervals do not interfere with power adjustments commands that do not cause a ping-pong effect.

While the present invention has been described in terms of several preferred embodiments, there are alterations, permutations, and equivalents which fall within the scope of the present invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method of controlling a transmit power of a first communication device, the first communication device being in communication with a second communication device in a communication system, wherein a first and a second criteria define a communication between the first and second communication devices, each of the first and second criteria having an upper bound and a lower bound, such that an adjustment of the transmit power of the first communication device affects the first and second criteria, the method comprising:

preventing an adjustment of the transmit power of the first communication device to thereby bring the communication (i) within the upper and lower bounds of the first criteria, and (ii) outside the upper and lower bounds of the second criteria, wherein preventing the adjustment is conditioned upon a contrary adjustment of the transmit power of the first communication device being performed, and a predetermined amount of time having expired since the contrary adjustment.

2. A method of controlling a transmit power of a first communication device, the first communication device being in communication with a second communication device in a communication system, wherein a first and a second characteristic define a communication between the first and second communication devices, the method comprising:

monitoring the first characteristic, the first characteristic having a value wherein an increase in transmit power increases the value of the first characteristic;

setting an upper and a lower bound for the value of the first characteristic; and determining if the value of the first characteristic has fallen below the lower bound of the first characteristic, wherein an increase of the transmit power of the first communication device is delayed until a first predetermined amount of time has expired provided that a previous power adjustment command caused the transmit power to be decreased.

3. A method as recited in claim 2, the method further comprising:

determining if the value of the first characteristic has risen above the upper bound of the first characteristic, wherein a decrease of the transmit power of the first communication device is delayed until a second predetermined amount of time has expired provided that a previous power adjustment command caused the transmit power to be increased.

4. A method as recited in claim 3, the method further comprising:

monitoring the second characteristic, the second characteristic having a value wherein an increase in transmit power increases the value of the second characteristic; setting an upper and a lower bound for the value of the second characteristic; and determining if the value of the second characteristic has fallen below the lower bound of the second characteristic, wherein an increase of the transmit power of the first communication device is delayed until a third predetermined amount of time has expired provided that the previous power adjustment command caused the transmit power to be decreased.

5. A method as recited in claim 4, the method further comprising:

determining if the value of the second characteristic has risen above the upper bound of the second characteristic, wherein a decrease of the transmit power of the first communication device is delayed until a fourth predetermined amount of time has expired provided that the previous power adjustment command caused the transmit power to be increased.

6. A method of controlling a transmit power of a first communication device, the first communication device being in communication with a second communication device in a communication system, wherein a first and second characteristic define a communication between the first and second communication devices, the method comprising:

monitoring the first characteristic, the first characteristic having a value wherein an increase in transmit power increases the value of the first characteristic; setting an upper and a lower bound for the value of the first characteristic; and determining if the value of the first characteristic has fallen below the lower bound of the first characteristic, wherein an increase of the transmit power of the first communication device is delayed until a first predetermined amount of time has expired provided that a previous power adjustment command caused the transmit power to be decreased;

determining if the value of the first characteristic has risen above the upper bound of the first characteristic, wherein a decrease of the transmit power of the first communication device is delayed until a second predetermined amount of time has expired provided that the previous power adjustment command caused the transmit power to be increased; monitoring the second characteristic, the second characteristic having a value wherein an increase in transmit power increases the value of the second characteristic; setting an upper and a lower bound for the value of the second characteristic;

determining if the value of the second characteristic has fallen below the lower bound of the second characteristic, wherein the increase of the transmit power of the first communication device is delayed until a third predetermined amount of time has expired provided that the previous power adjustment command caused the transmit power to be decreased; and determining if the value of the second characteristic has risen above the upper bound of the second characteristic wherein the decrease of the transmit power of the first communication device is delayed until a fourth predetermined amount of time has expired provided that the previous power adjustment command caused the transmit power to be increased.

7. A method as recited in claim 6, wherein the operations of determining whether the values of the first or second characteristic have fallen below their respective lower bounds is performed before the operations of determining whether the values of the first or second characteristic have risen above their respective upper bounds.

8. A method as recited in claim 6, wherein the transmit power of the first communication device is adjusted by a current power adjustment command after an appropriate predetermined amount of time has expired.

9. A method as recited in claim 8, the method further comprising:

limiting the current power adjustment command, such that if the current power adjustment command increases the transmit power of the first communication device, the current power adjustment command is limited to a maximum power output of the first communication device.

10. A method as recited in claim 8, the method further comprising:

limiting the current power adjustment command if the first communication device is not permitted to exceed the upper bound of the first characteristic, such that if the current power adjustment command increases the transmit power of the first communication device, the current power adjustment command is limited to an upper transmit power level.

11. A method as recited in claim 8, the method further comprising:

limiting the current power adjustment command if the first communication device is not permitted to exceed the upper bound of the second characteristic, such that if the current power adjustment command increases the transmit power of the first communication device, the current power adjustment command is limited to an upper transmit power level.

12. A method as recited in claim 8, the method further comprising:

limiting the current power adjustment command, such that if the current power adjustment command decreases the transmit power of the first communication device, the current power adjustment command is limited to a minimum power output of the first communication device.

13. A method as recited in claim 8, the method further comprising:

limiting the current power adjustment command if the first communication device is not permitted to fall below the lower bound of the first characteristic, such that if the current power adjustment command decreases the transmit power of the first communication device, the current power adjustment command is limited to a lower transmit power level.

14. A method as recited in claim 8, the method further comprising:

limiting the current power adjustment command if the first communication device is not permitted to fall below the lower bound of the second characteristic, such that if the current power adjustment command decreases the transmit power of the first communication device, the current power adjustment command is limited to a lower transmit power level.

15. A communication system comprising:

a mobile station; and a base transceiver station being in communication with the mobile station, the communication of the base transceiver station with the mobile station being characterized by a first characteristic having an upper and a lower threshold, the base transceiver station being configured to control the transmit power of the mobile station, wherein the base transceiver station waits until a first predetermined amount of time has expired to increase the transmit power of the mobile station when a value of the first characteristic falls below the lower threshold of the first characteristic provided that the base transceiver station previously decreased the transmit power of the mobile station.

16. A communication system as recited in claim 15, wherein the base transceiver station waits until a second predetermined amount of time has expired to decrease the transmit power of the mobile station when the value of the first characteristic rises above the upper threshold of the first characteristic provided that the base transceiver station previously increased the transmit power of the mobile station.

17. A communication system as recited in claim 16, the communication of the base transceiver station with the mobile station being characterized by a second characteristic having an upper and a lower threshold, wherein the base transceiver station waits until a third predetermined amount of time has expired to increase the transmit power of the mobile station when the value of the second characteristic falls below the lower threshold of the second characteristic provided that the base transceiver station previously decreased the transmit power of the mobile station.

18. A communication system as recited in claim 17, wherein the base transceiver station waits until a fourth predetermined amount of time has expired to decrease the transmit power of the mobile station when the value of the second characteristic rises above the upper threshold of the second characteristic provided that the base transceiver station previously increased the transmit power of the mobile station.

19. A communication system having a mobile station and a base transceiver station, wherein the mobile station and the base transceiver station are in communication, the communication being characterized by a first and a second characteristic, each of the first and second characteristics having an upper and a lower bound, the communication system comprising:

a power control means, the power control means controlling the transmit power of the mobile station, wherein the power control means prevents a present adjustment of the transmit power of the mobile station provided that a contrary adjustment of the transmit power of the mobile station was performed, and the present adjustment is not performed until a predetermined amount of time has expired since the contrary adjustment, the prevention of the present adjustment thereby bringing the communication within the upper and lower bounds of the first characteristic and outside the upper and lower bounds of the second characteristic.

20. A method of controlling a transmit power of a first communication device, the first communication device being in communication with a second communication device in a communication system, wherein first and second criteria define a communication between the first and second communication devices, each of the first and second criteria having an upper bound and a lower bound, such that an adjustment of the transmit power of the first communication device affects the first and second criteria, the method comprising:

preventing a present adjustment of the transmit power of the first communication device to bring the communication within the upper and lower bounds of the first criterion and outside the upper and lower bounds of the second criterion, provided that a contrary adjustment of the transmit power of the first communication device was performed in a preceding measurement interval, the preventing step extending until a predetermined amount of time has expired since the contrary adjustment, wherein the first and the second criteria are measured by the communication system at each successive measurement interval, and wherein the predetermined amount of time comprises at least two measurement intervals.

21. The method of claim 20, wherein the first criterion comprises signal-to-noise ratio and the second criterion comprises bit error rate.

22. The method of claim 20, wherein said step of preventing a present adjustment of transmit power includes the steps of:

measuring power and quality levels of the signal;

decrementing a timer until the predetermined amount of time has passed;

determining a power command for adjustment of the transmit power;

sending the power command.

23. The method of claim 22, wherein the power command is incremented by a predetermined step.

24. The method of claim 23, wherein the predetermined step is related to the signal quality.

25. The method of claim 23, wherein the predetermined step is related to the signal power.

26. The method of claim 23, wherein the predetermined step is related to the signal quality and power.

* * * * *